United States Patent [19]
Chesnes

[11] Patent Number: 5,916,518
[45] Date of Patent: Jun. 29, 1999

[54] COBALT-BASE COMPOSITION

[75] Inventor: Richard Patrick Chesnes, Zionsville, Ind.

[73] Assignee: Allison Engine Company, Indianapolis, Ind.

[21] Appl. No.: 08/827,723

[22] Filed: Apr. 8, 1997

[51] Int. Cl.$^6$ .................................................. C22C 19/07
[52] U.S. Cl. ........................... 420/438; 420/437; 420/436; 420/439; 420/435; 148/425; 148/408; 228/262.31
[58] Field of Search ....................... 228/262.31; 420/438, 420/437, 436, 439, 435; 148/408, 425

[56] References Cited

U.S. PATENT DOCUMENTS

| | | | |
|---|---|---|---|
| 3,993,454 | 11/1976 | Giggins et al. | 420/436 |
| 4,253,885 | 3/1981 | Maurer et al. | |
| 4,339,509 | 7/1982 | Dardi et al. | 428/680 |
| 4,737,205 | 4/1988 | Selman et al. | 148/410 |
| 4,830,934 | 5/1989 | Ferrigno et al. | 428/680 |
| 5,154,885 | 10/1992 | Czech et al. | 420/437 |
| 5,240,491 | 8/1993 | Budinger et al. | 228/262.31 |
| 5,273,712 | 12/1993 | Czech et al. | 420/438 |
| 5,282,946 | 2/1994 | Kinoshita et al. | 420/436 |
| 5,320,690 | 6/1994 | Beltran et al. | 148/512 |
| 5,422,072 | 6/1995 | Mitsuhashi et al. | 420/436 |
| 5,455,119 | 10/1995 | Taylor et al. | 420/437 |
| 5,582,635 | 12/1996 | Czech et al. | 106/14.05 |

*Primary Examiner*—Deborah Yee
*Attorney, Agent, or Firm*—Woodard, Emhardt, Naughton, Moriarty & McNett

[57] ABSTRACT

An improved cobalt-base braze alloy composition and method for diffusion brazing are provided for use in repairing superalloy articles, such as gas turbine engines, power generation turbines, refinery equipment, and heat exchangers. The improved cobalt-base braze alloy composition includes nickel; at least one element selected from the group of rhenium, palladium, and platinum; at least one element selected from the group of boron and silicon; and the remaining balance consists of cobalt. This composition may also include aluminum, and the composition may be combined with one or more powdered base metal superalloy compositions to form an improved diffusion braze alloy mixture. In the improved method for repairing superalloy articles, the foregoing mixture is applied to a region of the superalloy article to be repaired. The mixture is then heated to melt the cobalt-base braze alloy, thereby joining the base metal superalloy powder particles together, and joining the entire mixture to the region being repaired. The molten mixture is next subjected to a diffusion braze heat treatment cycle in order to break down undesirable boride and silicide phases and to diffuse the melting point depressants into the mixture. In a preferred embodiment, the long term diffusion heat treatment cycle consists of heating the repaired article to 2000° F., holding that temperature for 2 hours, heating the repaired article to 2100° F., holding that temperature for 22 hours, and cooling the article to 250° F. After cooling, an environmental coating is applied to the final repair composite, and this composite significantly improves the cyclic oxidation resistance of the coating compared to the properties of the superalloy base metal.

37 Claims, No Drawings

COBALT-BASE COMPOSITION

FIELD OF THE INVENTION

This invention relates generally to diffusion braze repair of superalloy articles and more particularly to cobalt-base braze alloy compositions containing at least one of the following elements: rhenium, palladium, platinum; and to long term diffusion heat treatment of repaired superalloy articles.

BACKGROUND OF THE INVENTION

High temperature operating environments such as those present in gas turbine engines, power generation turbines, refinery equipment, and heat exchangers demand parts composed of a variety of cobalt-, iron-, and nickel-base metals known as superalloys. These superalloys are capable of withstanding extremely high temperatures for extended periods of time, but the extremely stressful temperature conditions to which superalloy articles are subjected eventually takes its toll upon the metal in a number of ways.

The main types of damage to a superalloy article are cracks from thermal fatigue, wide gap cracks, foreign object impact damage, and dimensional reduction from mechanical wear. Because the cost of these superalloy components is quite high, there is considerable incentive to repair these types of defects rather than to scrap the part and replace it with a new one. The high cost of these components, as well as the fact that superalloy components, once damaged, tend to fail repeatedly in the same region, also makes it critical that any repairs made have mechanical, environmental, and processing properties equivalent to or better than the original superalloy base metal.

Traditional methods for repairing damaged superalloy articles involve choosing or creating an alloyed combination of elements that will melt at a temperature below the melting temperature of the superalloy substrate. These compositions are known in the industry as braze alloys, and the most useful prior art braze alloys are characterized as either nickel-base or cobalt-base alloys. Historically, the most popular braze alloys contain a melting point depressant such as silicon or boron; a complex of some of the same alloying elements used in the superalloy article to be repaired such as chromium, aluminum, titanium, tungsten, etc.; and either nickel or cobalt as the base. In fact, one braze alloy, sometimes known as B-28, is simply the combination of an alloy frequently used to manufacture cast turbine airfoils, named Rene'80, with about 2% boron.

Advances in the braze alloy composition art have brought multi-constituent alloy compositions which are mixtures of at least one braze alloy and at least one base metal alloy, the base metal alloy differing from the braze alloy in that it melts at a higher temperature than the braze alloy and contains no melting point depressants which can weaken the repair site. These multi-constituent compositions result in stronger repairs because the low-melting brazing alloy liquefies first, wetting the base metal constituent and joining the entire mixture to the superalloy article.

Once a braze alloy or alloy mixture has been chosen, the damaged superalloy article is cleaned to remove any environmental coating that may be over the base metal and any oxides that may have developed inside the damaged regions. The braze alloy composition is then applied to the region to be repaired, and the article subjected to a high temperature brazing cycle to melt and join the braze alloy to the superalloy article. Upon the completion of this cycle, typical braze alloys will have formed undesirable large blocky or script-like brittle phases composed of chromium, titanium, and the family of refractory elements (e.g., tungsten, tantalum) combined with the melting point depressants. These brittle phases weaken the repair composite and cannot be removed from conventional braze alloys.

However, certain braze alloy compositions, known as diffusion braze alloys, are capable of withstanding higher temperatures than conventional braze alloys. Diffusion braze alloys form the same bad phases during brazing as conventional alloys, but diffusion braze alloys can be subjected to a second, long-term high temperature heat cycle known as a diffusion cycle. This diffusion cycle allows the brittle borides, carbides, and silicides to break down into fine, discrete blocky phases. The diffusion cycle also diffuses the elemental melting point depressants into the braze alloy matrix. These actions result in a stronger repair that is less susceptible to incipient melting when the part is returned to service.

Unfortunately, the diffusion braze alloys of the prior art have failed to attain the crucial part-like mechanical and environmental properties demanded by the increased stresses to which today's superalloy articles are subjected. The main reason for this failure is that prior high temperature braze alloys and alloy powder mixtures tend to use only those elements present in the superalloy article being repaired.

This lack of flexibility in the compositions of the prior art has caused a stagnation in the development of truly new braze alloy compositions which employ elements and elemental combinations without regard to the composition of the superalloy substrate. As well, previous multi-constituent alloy compositions were so precisely matched to the particular superalloy to be repaired that it was considered unthinkable to select base metal powders for the mixture based solely on their mechanical and environmental properties.

A need therefore exists for a flexible diffusion braze alloy system capable of accommodating various new elements and base metal powders to increase the strength, flow characteristics, and oxidation resistance of the braze alloy system. A need also exists for a long-term diffusion heat treatment cycle capable of breaking down brittle phases and allowing the elemental melting point depressants to diffuse both into the superalloy substrate and the base metal matrix. A further need exists for a diffusion braze alloy composition which does not rely upon intentional carbon additions for strength. Additionally, a need exists for a diffusion braze alloy composition capable of imparting improved environmental resistance to the superalloy substrate and/or any environmental coating which may be applied to the substrate.

Such a new diffusion braze alloy system desirably employs the elements rhenium, platinum, palladium and/or aluminum in order to improve significantly over the hot corrosion and oxidation resistance properties provided by prior art braze alloys. Additionally, such an improved braze alloy composition preferably uses boron and silicon concurrently as melting point depressants in order to reduce the undesirable mechanical and environmental properties associated with the use of either boron or silicon alone. The present invention addresses these needs.

SUMMARY OF THE INVENTION

Briefly describing one aspect of the present invention, there is provided an improved cobalt-base braze alloy composition and method for diffusion braze repair of superalloy articles that achieves mechanical, processing, and environmental properties equivalent to and, in many cases, better than those properties possessed by the superalloy articles. The present cobalt-base braze alloy composition comprises nickel; at least one element selected from the following group: rhenium, palladium, platinum; boron; silicon; and cobalt. This composition may also include aluminum, chromium, titanium, tungsten, molybdenum, niobium, hafnium, tantalum, iron, manganese, yttrium, and/or zirconium, which elements appear in many advanced superalloy base metal compositions. This cobalt-base braze alloy composition may be combined with one or more powdered base metal superalloy compositions to form an improved diffusion braze alloy mixture having enhanced mechanical, environmental, and processing properties compared to prior art braze alloy mixtures. The present invention also provides new cobalt-base base metal alloy compositions for use in such improved diffusion braze alloy mixtures, which base metal alloy compositions do not include melting point depressants but which are otherwise similar to those of the braze alloy compositions.

The present invention employs melting point depressants such as boron, silicon, and aluminum to reduce the melting point of the braze alloy. Although the present braze alloy compositions contain relatively low amounts of melting point depressants, these depressants nonetheless adversely affect the mechanical and/or environmental properties of a repaired article unless they are subjected to a long-term diffusion heat treatment cycle.

The present invention therefore describes an improved diffusion heat treatment method to break down the undesirable phases formed by the melting point depressant(s) and diffuse the depressant(s) into the base metal alloy matrix. In this way, this long-term diffusion heat treatment method minimizes the negative properties associated with the use of conventional melting point depressants.

In the brazing method of the present invention, a damaged region of a superalloy article is repaired by first cleaning the article by any conventional means; preparing a braze alloy composition mixture according to the present invention, wherein the mechanical and environmental properties of that mixture are chosen to equal and preferably improve upon those properties of the superalloy article to be repaired; depositing this mixture on the region to be repaired; and placing the superalloy article in a furnace under an inert gas atmosphere or under a vacuum. Once in such a furnace, the pressure in the furnace chamber should be reduced to approximately $1 \times 10^{-3}$ torr or a lower pressure and the brazing cycle initiated by heating the repaired region to a temperature of about 800° F. The 800° F. temperature is maintained for approximately 15 minutes, whereafter the temperature is increased to about 1800° F. and that temperature maintained for approximately 15 minutes. Next, the temperature is again raised to 2225° F. and that temperature maintained for between 15 and 45 minutes. Finally, the furnace is vacuum cooled from about 2225° F. to about 1800° F. This step completes the conventional brazing cycle which causes the formation of undesirable brittle phases. The next steps in the present method constitute the diffusion heat treatment cycle that will break down these brittle phases.

Upon completion of the high temperature brazing cycle, the superalloy article is subjected to a pressure higher than the pressure used in the brazing cycle and reheated to a temperature of between 1 and 400° F. below the chosen brazing temperature for the article. This temperature is maintained for at least 20 hours, whereafter the temperature is lowered to about 250° F. At this point, the superalloy article is fully repaired and ready for machining.

The superalloy article is then usually coated with a metal or ceramic, diffusion or overlay coating according to any known application method. This coating protects the superalloy base metal from oxidation and hot corrosion attack, and, if the superalloy article is given a multi-layer coating of which at least one layer is a cobalt-base braze alloy according to the present invention, the coating remains resistant to environmental attack much longer than a traditional coating.

One objective of the present invention is to provide a cobalt-base diffusion braze alloy composition including one or more of the elements rhenium, palladium, and platinum which elements enhance the solid solution strength of the repair composite to such an extent that other solid solution strengthening elements considered undesirable for oxidizing environments and normally contained within conventional braze alloy compositions may be reduced or removed entirely from the braze alloy composition.

Another object of the present invention is to provide a cobalt-base diffusion braze alloy containing elements such as platinum and palladium which improve the flow characteristics of the braze alloy and impart mechanical, processing, and environmental resistance properties to the repaired region equal to or better than those of the superalloy article.

Another object of the present invention is to provide a cobalt-base diffusion braze alloy composition including one or more of the elements rhenium, platinum, and palladium which elements enhance and improve the oxidation resistance of the repair composite compared to the oxidation properties of the superalloy article.

Another object of the present invention is to provide a cobalt-base diffusion braze alloy having no intentional carbon additions, which removal of carbon thereby reduces the amount of carbides in the repair composite and prevents the agglomeration of carbides at the interface of the repair composite and the superalloy article.

Another object of the present invention is to provide a cobalt-base diffusion braze alloy composition including aluminum in order to achieve gamma-prime strengthening of the repair composite, in order to enhance the oxidation resistance properties of the repaired region, and to reduce the melting point of the diffusion braze alloy composition.

Another object of the present invention is to provide a cobalt-base diffusion braze alloy composition employing concurrent boron and silicon additions as melting point depressants in order to minimize the detrimental properties associated with use of boron and silicon alone while still achieving a reduced melting point, desirable flow characteristics, and oxidation resistance.

Another object of the present invention is to provide a cobalt-base diffusion braze alloy composition capable of incorporating and efficiently diffusing throughout one or more base metal alloy powders in a braze alloy mixture in order to impart mechanical, processing, and environmental resistance properties to the repaired region equal to or better than those of the superalloy article.

Another object of the present invention is to provide a cobalt-base diffusion braze alloy composition capable of improving the adhesion of an environmental coating deposited upon the superalloy article and thereby improving the environmental resistance of the superalloy article.

Another object of the present invention is to provide a cobalt-base high temperature base metal alloy including one or more of the elements rhenium, palladium, platinum, and aluminum and not including carbon, whereby the base metal alloy enjoys all the benefits such elemental additions and deletions impart as discussed above.

A further object of the present invention is to provide a method for repairing superalloy articles which incorporates a long term diffusion heat treatment cycle to break down the brittle phases associated with the use of melting point depressants such as boron, carbon, and silicon.

These and other objects, advantages and features are accomplished according to the compositions and methods of the following description of the preferred embodiment of the present invention.

DESCRIPTION OF THE PREFERRED EMBODIMENT

For the purposes of promoting an understanding of the principles of the invention, reference will now be made to the preferred embodiments thereof, and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

The principal objective of the present invention is to achieve mechanical, processing, and environmental resistance properties in a braze alloy repair composite that equal, if not exceed, the levels of these properties enjoyed by the superalloy substrate, or base metal. Prior art braze alloy compositions have failed to achieve this objective for several reasons. First, prior art braze alloy systems are unable to reduce the melting point of the brazing alloy without embrittling either the repair composite or the superalloy substrate. Second, skilled artisans have for so long considered it crucial that the elements of the braze alloy system match those of the superalloy article to be repaired that it was thought impossible or unworkable to repair a superalloy article using any other elements. And lastly, this old way of thinking about braze alloy compositions prevented artisans from investigating what base metal alloys could be added to a braze alloy system to improve a repair's solid solution strengthening and oxidation resistance properties.

It is clear that braze alloy systems having the foregoing problems cannot effectively repair today's higher temperature and higher strength superalloys which undergo greater mechanical and thermal stresses than ever before, and which cost more to manufacture than ever before. Therefore, the compositions and method of the present invention introduce new elements and elemental combinations not previously considered for use in the field of diffusion braze repair in order to overcome the disadvantages of the prior art and to give the superalloy component a longer useful life than was previously considered attainable.

The cobalt-base diffusion braze alloy composition of the present invention has the following general composition range, by weight:

| Elements | Weight Percent |
| --- | --- |
| Cobalt | Balance |
| Nickel | 0.001–<Co |
| Chromium | 0–40 |
| Aluminum | 0–12 |
| Titanium | 0–6 |

-continued

| Elements | Weight Percent |
| --- | --- |
| Tungsten | 0–15 |
| Molybdenum | 0–15 |
| Niobium | 0–12 |
| Rhenium | 0.001–15 |
| Hafnium | 0–6 |
| Tantalum | 0–15 |
| Platinum | 0.001–40 |
| Palladium | 0.001–40 |
| Iron | 0–3 |
| Manganese | 0–1 |
| Carbon | 0–2.0 |
| Boron | 0.001–6 |
| Silicon | 0.001–10 |
| Yttrium | 0–2 |
| Zirconium | 0–2 |

While the foregoing constitutes a general description of the cobalt-base braze alloy composition of the present invention, the following are specific examples of preferred compositions according to the present invention. These specific examples are provided for purposes of illustrating the invention, and no limitations on the invention are intended thereby. Before proceeding further, it should also be noted that when zeroes are used in the composition tables of the present invention, those zeroes indicate no intentional addition of the element, not that the element is absent from the composition. It is not economically feasible to use 100% pure elemental additions, and therefore some impurities may be introduced into the composition.

A first preferred embodiment of the cobalt-base braze alloy composition of the present invention is known as "RCA-C1" and has the following composition:

| Elements | Weight Percent |
| --- | --- |
| Cobalt | Balance |
| Nickel | 10.5 |
| Chromium | 23 |
| Aluminum | 1.5 |
| Titanium | 1.75 |
| Tungsten | 3 |
| Rhenium | 1 |
| Tantalum | 6 |
| Platinum | 0–40 |
| Palladium | 0–40 |
| Carbon | 0–0.55 |
| Boron | 1.5 |
| Silicon | 5 |

A second preferred embodiment of the cobalt-base braze alloy composition of the present invention is known as "RCA-C2" and has the following composition:

| Elements | Weight Percent |
| --- | --- |
| Cobalt | Balance |
| Nickel | 10 |
| Chromium | 22.5 |
| Titanium | 0.1 |
| Tungsten | 7 |
| Rhenium | 0.001–15 |
| Tantalum | 3.5 |
| Platinum | 0–40 |
| Palladium | 0–40 |
| Carbon | 0–0.6 |
| Boron | 1.5 |
| Silicon | 5 |
| Zirconium | 0.5 |

A third preferred embodiment of the cobalt-base braze alloy composition of the present invention is known as "RCA-C3" and has the following composition:

| Elements | Weight Percent |
|---|---|
| Cobalt | Balance |
| Nickel | 10.5 |
| Chromium | 20.5 |
| Aluminum | 2.25 |
| Tungsten | 1.25 |
| Rhenium | 1 |
| Tantalum | 7.75 |
| Platinum | 0–40 |
| Palladium | 0–40 |
| Carbon | 0–0.28 |
| Boron | 3 |

A fourth preferred embodiment of the cobalt-base braze alloy composition of the present invention is known as "RCA-C6" and has the following composition:

| Elements | Weight Percent |
|---|---|
| Cobalt | Balance |
| Nickel | 30.75 |
| Chromium | 14.75 |
| Aluminum | 3.38 |
| Tungsten | 1.38 |
| Rhenium | 0.5 |
| Tantalum | 8.8 |
| Hafnium | 0.5 |
| Platinum | 0–40 |
| Palladium | 3 |
| Carbon | 0–0.3 |
| Boron | 2.33 |
| Silicon | 3.38 |

A most preferred embodiment of the cobalt-base braze alloy composition of the present invention is known as "RCA-C4" and has the following composition:

| Elements | Weight Percent |
|---|---|
| Cobalt | Balance |
| Nickel | 10.5 |
| Chromium | 23 |
| Aluminum | 1.75 |
| Tungsten | 1.25 |
| Rhenium | 1 |
| Platinum | 0–40 |
| Palladium | 0–40 |
| Tantalum | 6.5 |
| Carbon | 0–0.55 |
| Boron | 2.15 |
| Silicon | 3.25 |

Turning now to discuss the novelty of the foregoing compositions, it will be obvious to one of ordinary skill that certain preferred embodiments of the instant diffusion braze alloy compositions are formulated with concurrent boron and silicon additions as melting point depressants. Prior art braze alloys, in contrast, have traditionally used boron alone as the melting point depressant for two major reasons: (1) boron diffuses exceptionally well into the base metal matrix of a braze alloy mixture, and (2) this boron diffusion results in a higher remelt temperature of the final repair composite. Boron in a braze alloy thus ensures that the repair composite will be able to withstand the same high temperatures withstood by the superalloy substrate itself.

However, exceptionally high boron concentrations in a braze alloy promote embrittlement of the superalloy base metal and incipient melting. These deleterious effects reduce the number of repairs that can be performed upon any one region of a superalloy article and thereby shorten the operating life of the part since superalloy components tend to fail repeatedly in the same area.

Silicon alone is typically used in conventional (non-diffusion) brazing alloy compositions to speed the alloy's rate of flow into a damaged region. Unfortunately, silicon-only braze alloys do not typically have a high degree of diffusivity into the base metal matrix, and they tend to form very stable silicides. These silicides form large, brittle, script-like phases in the microstructure of the repair composite which can degrade the mechanical properties of both the repair composite and the superalloy base metal.

Embodiments of the present invention combine the two elements to minimize the undesirable effects of using either boron or silicon alone and maximize the beneficial properties imparted by each element. When boron and silicon are combined, the amount of boron necessary to reduce the melting temperature of the alloy is decreased, which reduces the high concentrations of boron in the superalloy substrate. The instant braze alloy system thus enjoys the strength and high temperature melting properties imparted by boron without having to sacrifice the superalloy base metal in the process.

Similarly, the silicon additions in the present braze alloy compositions improve the flow characteristics of the braze alloy without embrittling the repair composite with large amounts of script-like silicide phases. This latter benefit is assured when the long-term diffusion heat treatment cycle of the present invention is used to homogenize the braze alloy/base metal mixture and diffuse the elemental boron and silicon into the base metal matrix. Silicon also has the unexpected benefit of improving the performance of any environmental coating placed over the repaired region. This feature helps assure long life of the repaired area and gives it improved environmental resistance properties over the original superalloy substrate.

It should be understood, however, that the use of either boron or silicon alone as a melting point depressant is also considered and intended to come within the scope of the present invention. As will be discussed in greater detail below, the use of palladium, platinum, and especially rhenium in the preferred compositions of the present invention significantly reduce the deleterious brittle phases associated with the use of boron alone and thereby help to increase the re-melt temperature of the final repair composite. The present compositions, therefore, achieve unexpected results over traditional boron- or silicon-only diffusion braze alloys.

Cobalt-base base metal alloy compositions are also intended to come within the scope of the present invention. As discussed previously, braze alloy compositions may be used alone to repair part damage, but significant benefits in mechanical strength and processing properties can be achieved when a part is repaired using a mixture of one or more braze alloys and one or more base metal components. The main reason for these improvements over single-component braze alloy systems is that the amount of melting point depressants used can be significantly reduced. To achieve such property improvements, then, the present invention has described braze alloy compositions which may be combined with any known superalloy base metal to create an improved repair composite. The following discussion describes new base metal alloy compositions which can be combined with the instant and/or any other known braze alloy compositions to also create an improved repair composite.

The base metal alloy compositions described herein possess the same general composition range as the braze alloy compositions of the present invention, but obviously do not include boron or silicon. Therefore, the instant base metal alloy compositions comprise generally, by weight:

| Elements | Weight Percent |
| --- | --- |
| Cobalt | Balance |
| Nickel | 0.001–<Co |
| Chromium | 0–40 |
| Aluminum | 0–12 |
| Titanium | 0–6 |
| Tungsten | 0–15 |
| Molybdenum | 0–15 |
| Niobium | 0–12 |
| Rhenium | 0.001–15 |
| Hafnium | 0–6 |
| Tantalum | 0–15 |
| Platinum | 0.001–40 |
| Palladium | 0.001–40 |
| Iron | 0–3 |
| Manganese | 0–1 |
| Carbon | 0–2.0 |
| Yttrium | 0–2 |
| Zirconium | 0–2 |

While the foregoing constitutes a general description of the cobalt-base base metal alloy composition of the present invention, the following are specific examples of preferred compositions according to the present invention. These specific examples are provided for purposes of illustrating the invention, and no limitations on the invention are intended thereby.

A first preferred embodiment of the cobalt-base base metal alloy composition of the present invention is known as "RCA-B1" and has the following composition:

| Elements | Weight Percent |
| --- | --- |
| Cobalt | Balance |
| Nickel | 10 |
| Chromium | 22.5 |
| Aluminum | 2 |
| Tungsten | 5 |
| Rhenium | 0.5 |
| Tantalum | 6 |
| Platinum | 0–40 |
| Palladium | 0–40 |
| Carbon | 0–0.55 |
| Zirconium | 0.5 |

A most preferred embodiment of the cobalt-base base metal alloy composition of the present invention is known as "RCA-B2" and has the following composition:

| Elements | Weight Percent |
| --- | --- |
| Cobalt | Balance |
| Nickel | 10.5 |
| Chromium | 22 |
| Aluminum | 1.75 |
| Tungsten | 4 |
| Tantalum | 6.5 |
| Rhenium | 0–15 |
| Palladium | 0–40 |
| Platinum | 0.001–40 |
| Carbon | 0–0.55 |

As can be seen in all the foregoing diffusion alloy compositions, braze alloys and base metal alloys alike, the instant alloy compositions contemplate use of one or more elements from the following group: rhenium, palladium, and platinum. The use of rhenium, palladium and platinum in cobalt-base diffusion alloys represents a significant advance in the art of diffusion braze repair of superalloy articles because it departs radically from the traditional diffusion braze alloy composition: a powder of the same superalloy as the damaged component with a measure of melting point depressants added to lower the brazing temperature. These new alloy compositions are formulated to not only repair, but also to improve, the mechanical, processing, and environmental properties possessed by the superalloy base metal. It is well known that failures in superalloy components regularly occur in the same or an immediately adjacent location. It is therefore extremely important that these areas of fatigue be repaired to be even stronger than the original superalloy base metal. The compositions of the present invention achieve this objective by successfully combining certain elements such as rhenium, platinum group elements, and aluminum, and by removing carbon from the compositions.

The first of these new preferred elements, rhenium, is preferably added to the cobalt-base alloy compositions of the present invention in an amount from 0 to 15 weight percent. Rhenium additions give the present compositions significantly improved mechanical and environmental properties over other, more traditional, solid solution strengthening elements such as tungsten, molybdenum, or hafnium. The mechanical properties associated with rhenium compositions are similar to those achievable by using tungsten and molybdenum; however, rhenium has significant oxidation resistance properties that the tungsten and molybdenum-type elements do not have. Therefore, the inclusion of rhenium in the compositions of the present invention permits a skilled artisan to reduce or completely remove other solid solution strengthening elements that are undesirable for use in oxidizing environments. Of additional benefit to the preferred composition embodiments, rhenium does not promote sigma phase formation in the repair composite or the adjacent superalloy base metal.

Another benefit of rhenium-containing compositions according to the present invention relates to rhenium's effect on melting point depressants in the alloy matrix. Unexpectedly, the addition of rhenium to the present preferred braze alloy compositions works so well to bind up significant amounts of melting point depressants that the elements which traditionally form brittle phases (e.g., chromium, tungsten) are left in solid solution to strengthen the repair composite and improve environmental resistance. As well, the instant preferred compositions eliminate the diffusion of excess melting point depressants into the adjacent base metal of the superalloy article. This is true even when silicon is not used concurrently with boron, and the amount of melting point depressants which can be successfully incorporated in the alloy matrix increases with the length of the long-term heat treatment diffusion cycle. The present compositions can therefore use boron alone to lower the melting temperature of the braze alloy and achieve the benefit of a higher re-melt temperature for the repair composite without experiencing the weak and destructive brittle phases or the excess boron diffusion experienced with the prior art boron-containing braze alloys.

Platinum, the second preferred new element, may be added to the present compositions in a range of from 0 to 40 weight percent. The addition of platinum and/or other platinum group elements, such as osmium, rhodium, iridium, and palladium, improves the hot corrosion and oxidation resistance properties of the repair composite. As well, platinum and other platinum group metals added to the present invention in sufficiently high concentrations improve the ductility, or plasticity, of the repair composite.

The addition of palladium is contemplated by the present invention because it achieves improvements in the repair composite similar to those achieved by platinum. For example, palladium enhances the oxidation resistance of the repair site and improves the ductility of the repair composite. Palladium also enhances the flow characteristics of the instant braze alloy compositions, and nickel and palladium are 100% soluble when combined in a braze alloy mixture. Further, palladium additions have been shown to retard the formation of undesirable borides and suicides in the alloy matrix.

Another element contemplated by and intended to come within the scope of the present invention is aluminum. Conventional high temperature braze alloys such as AMS 4783 do not have aluminum in them. This is because the aluminum reduces the flowability of the braze by the rapid formation of aluminum oxide, a material commonly used for the prevention of braze flow. Additionally, different surface tensions and viscosities occur which change the braze flow characteristics when aluminum is used. Because diffusion braze alloys do not have the same flow requirements as conventional braze alloys, diffusion braze alloys allow the use of aluminum. Nonetheless, aluminum is not normally used in cobalt-base superalloy repair because prior art repair systems typically use powdered cobalt superalloys combined with a braze alloy to repair a cobalt superalloy substrate, and cobalt superalloys do not contain aluminum.

Cobalt superalloys are typically used in the temperature range at which the superalloy base metal is subject to hot corrosion attack and damage. Certain turbine manufacturers have recently begun to push the operating temperatures for cobalt superalloys above this temperature range and into the oxidation mode of base metal attack and damage. It is for this reason that the present invention includes aluminum in a cobalt-base diffusion braze alloy composition. By including aluminum in the instant compositions, the final repair composite receives additional protection from preferential oxidation at the repaired areas of the superalloy components; the gamma prime phase of the alloy matrix is strengthened over non-aluminum containing cobalt-base braze alloys; and the introduction of aluminum helps reduce the melting point of the braze alloy composition. These benefits outweigh any previously encountered difficulties with braze flow characteristics, and the inclusion of aluminum represents a significant advance in the diffusion braze alloy art.

It is well known in the art that, other than using solid solution strengthening elements, carbides are the primary strengthening mechanism for cobalt-base alloys. Because the compositions of the present invention include such effective solid solution strengthening elements as rhenium, and because the present compositions contemplate the use of silicides and/or borides to strengthen the alloy matrix as effectively as carbides, carbon may effectively be removed from the present compositions without suffering any loss in mechanical properties.

It is particularly beneficial to remove carbon from diffusion alloy compositions because carbon prefers to agglomerate and precipitate out of the alloy matrix at lower temperatures. Carbides therefore exhibit poor ductility and have poor oxidation resistance. Carbide particles in a cobalt-base alloy system also tend to go into solution in the alloy matrix and disappear at high temperatures. However, as soon as the superalloy cools, the carbides precipitate out of the matrix and form a carbide line at the interface of the repair composite and the superalloy substrate. This carbide line allows the repair composite to break away from the superalloy substrate in a zipper-like fashion. The mere possibility of such a significant repair failure makes removing carbon from the present invention a significant improvement in the art.

Of importance, the most preferred embodiments of the present compositions are prealloyed powders. The prealloying is accomplished using well-known methods according to the following procedure: the basic elements are first mixed in the required weight percentages in a container; this mixture is then melted at high temperature; and the molten mixture is atomized by spraying the metal through a high pressure nozzle and cooling it with argon gas. This technique solidifies the once discrete elements into uniform powder particles. Skilled artisans will recognize that the properties of a prealloyed mixture are significantly different from those of a simple mixture of elements, and the improvements achieved by the present invention rely in part upon the fact that these compositions are prealloyed.

The present alloy compositions contemplate the inclusion of a number of other elements typically used in advanced superalloy compositions, including solid solution strengtheners such as cobalt, molybdenum, and tungsten; gamma-prime formers such as nickel, hafnium, niobium, titanium, and tantalum; sacrificial oxide formers such as chromium; carbide formers such as zirconium; elements to improve ductility such as manganese; and other elements such as iron. Because these elements are commonly used in superalloy base metals and braze alloys and because the properties they impart to those systems are well known in the art, those of ordinary skill will understand which elements to choose to customize the instant compositions to their specifications.

Having now described the preferred composition formulations of the present invention, it is necessary to discuss the preferred mixtures for use in repairing a damaged superalloy component. It is known in the art of superalloy repair that combining in a braze alloy mixture a high temperature melting composition and one or more compositions which melt at a lower temperature will improve the strength of the repair composite while still providing adequate flow characteristics to facilitate placement and insertion of the braze alloy system into the damaged region. However, the high temperature component used in prior mixtures was nothing more than a powder of the same superalloy as the article being repaired.

The present invention, in contrast, describes a diffusion braze alloy system which employs base metal powders chosen without regard to the composition of the superalloy substrate. Instead, the present invention chooses which base metal powders to incorporate based on the properties those base metals will impart to the braze alloy system or, the repair composite. In certain preferred embodiments of the present invention, the use of multiple base metal components, whether iron-, cobalt-, or nickel-base, enhances the mechanical, environmental, and processing properties of the instant braze alloy system.

As an example, one base metal powder may be chosen for its strength and another base metal powder chosen for its improved braze flow characteristics. One preferred embodiment of the mixture of the present invention uses a base metal alloy powder known in the industry as Mar-M509. Mar-M509 is known to provide a very strong repair composite, but it is not preferred for use in diffusion braze repair because it slows the flow of molten braze mixture during the high temperature braze cycle. This slow flow characteristic is especially undesirable when the damage to the superalloy article is in the form of a crack or a wide gap. It is therefore desirable when repairing cracks and gaps to include a second base metal powder known in the industry as X40. When used alone, X40 makes for a relatively weak repair composite, but when combined with Mar-M509, it improves the flow characteristics of the braze alloy system and permits cracks and gaps to be filled with a stronger repair composite. Certain other preferred embodiments of the present invention choose the high temperature base metal alloy compositions of the present invention in order to impart the improved properties associated with those base metal powders to the braze alloy mixture.

Although the following may generally be known in the industry, it is instructive for practicing the present invention that in the embodiments of the present braze alloy mixtures preferred for repairing cracks, the braze alloy composition or compositions comprise no more than 50% by weight of the total braze alloy mixture. Wide cracks and gaps may be repaired with the present mixtures if the percentage by weight of the braze alloy composition or compositions is kept to about 40%. Similarly, dimensional repairs, or build-ups, are most effectively performed when the total weight of braze alloy in the mixture does not exceed 40%.

It will be obvious to those of ordinary skill which mixture percentages should be applied to which types of structural damage. Accordingly, one preferred embodiment of the braze alloy mixture of the present invention comprises a powder metal slurry. Another preferred embodiment of the present mixture invention takes the form of a plasticized powdered metal alloy tape. Another preferred embodiment of this mixture comprises a pre-sintered alloy tape. Alternatively, one preferred embodiment of the present invention especially useful for dimensional repair comprises a pre-sintered alloy preform.

In practice, after the damage has been assessed, the preferred braze alloy composition or compositions of the present invention chosen, the base metal alloy composition or compositions chosen, and the braze alloy and base metal compositions combined in the appropriate ratio corresponding to the damage to be repaired, the superalloy article is cleaned of all coatings and oxides using techniques known in the art for such cleaning. The chosen braze alloy mixture in the embodiment appropriate to repair the damage, e.g., powder metal slurry, tape, etc., is then applied to the damaged region and the superalloy article subjected to a high temperature brazing cycle in a vacuum or in an inert gas atmosphere. This high temperature brazing cycle melts the braze alloy portion of the mixture, thereby creating a base metal powder matrix within the braze alloy composition, and joining the entire mixture to the now-repaired superalloy substrate.

One preferred inventive method for repairing damaged superalloy components involves a high temperature brazing cycle having the following steps: placing the mixture-coated superalloy article in an inert gas atmosphere or under vacuum in a brazing furnace; obtaining a pressure of $1 \times 10^{-3}$ torr or lower pressure in the inert gas atmosphere or under the vacuum; heating the braze alloy mixture to a temperature of about 800° F. and holding that temperature for approximately 15 minutes; thereafter increasing the temperature to about 1800° F. and holding that temperature for approximately 15 minutes; then increasing the temperature again to about 2225° F. and holding that temperature for 15 to 45 minutes; whereafter the temperature is vacuum cooled from about 2225° F. to about 1800° F.

While the foregoing high temperature braze cycle has been described, it will be understood by skilled artisans that any series of temperatures and brazing times capable of melting only the braze alloy composition and permitting that braze alloy composition sufficient time to flow and effect the repair while forming a solid solution matrix and precipitating those particles of the gamma-prime phase are considered and intended to be encompassed herein. Those of ordinary skill in the art will also understand that the lower the pressure in the brazing furnace during this brazing cycle, the lower the vapor pressure of the sacrificial oxide forming elements, and thus the better the flow of the braze alloy during the braze cycle.

The next series of steps in the preferred repair method of the present invention comprise the long term diffusion heat treatment cycle. This diffusion cycle is critical to homogenize the remaining solidified braze alloy system microstructure and diffuse the elemental melting point depressants into the alloy matrix. The particular steps used in this diffusion heat treatment cycle comprise the following: obtaining a pressure in the furnace higher than the pressure used in the high temperature braze cycle, preferably in the range of about 250 torr; heating the mixture deposited on the repaired region to a temperature of about 2000° F.; holding the temperature at about 2000° F. for approximately 2 hours; increasing the temperature to about 2100° F.; holding the temperature at about 2100° F. for approximately 22 hours; and lowering the temperature from about 2100° F. to about 250° F.

While this diffusion cycle may be altered slightly in terms of the temperatures employed, the range of preferred temperatures for the diffusion braze cycle of the present invention are between 1° and 400° F. less than the highest temperature achieved during the high temperature brazing cycle. The range of preferred pressures includes any pressure higher than the pressure used in the braze cycle but lower than atmospheric pressure. Those of ordinary skill will recognize that the higher the pressure, the less chromium and other elemental vaporization from the repair composite and the superalloy article there will be, and therefore the less elemental loss there will be.

Additionally, the diffusion braze holding times may vary slightly from the holding times described above, but preferred holding times are in the range of at least 20 hours to about 32 hours in order to permit the repair composite sufficient time to break down the script-like silicide phases into fine discrete particles. Preferred diffusion cycle times are also adequate both to reduce the size and quantity of brittle boride phases in the repair matrix caused by chromium, titanium, and members of the refractory family of elements (tungsten, tantalum, etc.) combining with boron, and to diffuse the elemental boron and silicon into the repair composite matrix.

Upon completion of the long term diffusion heat treatment cycle, the repaired part is usually given a new metal or ceramic, diffusion or overlay coating by means of any known coating method. Such coatings protect both the superalloy article and/or the repaired area from oxidation, hot corrosion, and extreme thermal gradients. Examples of typical environmental coatings are simple aluminides, platinum aluminides, MCrAl(X)-type overlays, and ceramics. Typical metal coatings such as these may be used alone as a single layer coating, as the final layer of a multilayer coating, or as a bonding coat for a ceramic top coat; and the ceramic coatings may be used alone directly atop the superalloy article surface, or as the final coating atop a bonding coat. However, it is also contemplated by and intended to come within the scope of the present invention to use the present cobalt-base braze alloy compositions as a new type of metal coating which may be used to coat a superalloy article by means of any coating method. The instant compositions may also form part of a multilayer coating system in which the present compositions are applied to the surface of a superalloy article either before or after another environmental coating has been applied.

It has been discovered through the course of high temperature cyclic oxidation testing of superalloy parts coated and/or repaired according to the present invention that the combination of the present braze alloy composition(s) with one or more environmental coatings yields unexpected, inventive, and beneficial improvements in oxidation resistance. Specifically, the instant cobalt-base braze alloy compositions significantly improve the adhesion of an environmental coating to the repair composite. By way of example and not of limitation, the cyclic oxidation testing was performed at both 2075° F. and 2000° F. on repaired cobalt base metal coupon specimens, and the specimens of both test conditions exhibited similar results. The test performed at 2075° F. indicated that the coating spalled off of the cobalt base metal specimens after 40 cycles. The coating did not spall off the braze repaired areas of the coupons, but it was consumed after 300 cycles. The coating around the brazed areas started to spall after approximately 100 cycles. At 2000° F., the test results were identical, except the coating over the repair composite lasted over 500 cycles with no loss of coating. It is believed that these surprising achievements in oxidation resistance are a result of the careful balance struck between the oxidation properties and the mechanical properties of the elements used in the present preferred compositions.

While the invention has been described in detail in the foregoing description, the same is to be considered as illustrative and not restrictive in character, it being understood that only the preferred embodiments have been shown and described, and that all changes and modifications that come within the spirit of the invention are desired to be protected.

What is claimed is:

1. A cobalt-base braze alloy composition, consisting essentially of, by weight:
   Nickel from about 0.001% to <the weight percent of cobalt;
   At least one element selected from the group consisting of:
   Rhenium from about 0.001% to about 15%;
   Palladium from about 0.001% to about 40%;
   Platinum from about 0.001% to about 40%;
   At least one element selected from the group consisting of:
   Boron from about 0.001% to about 6%;
   Silicon from about 0.001% to about 10%; and
   Cobalt balance.

2. A cobalt-base braze alloy composition, consisting essentially of, by weight:
   Nickel from about 0.001% to <the weight percent of cobalt;
   One element selected from the group consisting of:
   Rhenium from about 0.001% to about 15%;
   Palladium from about 0.001% to about 40%;
   Platinum from about 0.001% to about 40%; and
   Cobalt balance; wherein
   said braze alloy composition is a eutectic alloy.

3. A cobalt-base high temperature base metal alloy composition, consisting essentially of, by weight:
   Nickel from about 0.001% to <the weight percent of cobalt;
   Rhenium from about 0.001% to about 15%;
   At least one element selected from the group consisting of:
   Palladium from about 16% to about 40%;
   Platinum from about 16% to about 40%; and
   Cobalt balance.

4. The braze alloy composition of claim 1, further comprising, by weight:
   Aluminum from about 0.001% to about 12%.

5. The braze alloy composition of claim 2, further comprising, by weight:
   Aluminum from about 0.001% to about 12%.

6. The base metal alloy composition of claim 3, further comprising, by weight:
   Aluminum from about 0.001% to about 12%.

7. The braze alloy composition of claim 1, further comprising, by weight:
   At least one element selected from the group consisting of:
   Chromium from about 0.001% to about 30%;
   Tantalum from about 0.001% to about 15%;
   Molybdenum from about 0.001% to about 15%;
   Niobium from about 0.001% to about 12%; and
   Tungsten from about 0.001% to about 15%.

8. The braze alloy composition of claim 7, further comprising, by weight:
   At least one element selected from the group consisting of:
   Titanium from about 0.001% to about 6%;
   Hafnium from about 0.001% to about 6%;
   Iron from about 0.001% to about 3%;
   Manganese from about 0.001% to about 1%; and
   Zirconium from about 0.001% to about 2%.

9. The braze alloy composition of claim 8, further comprising, by weight:
   Carbon from about 0.001% to about 2%.

10. The base metal alloy composition of claim 6, further comprising, by weight:
    At least one element selected from the group consisting of:
    Chromium from about 0.001% to about 30%;
    Tantalum from about 0.001% to about 15%;
    Molybdenum from about 0.001% to about 15%;
    Niobium from about 0.001% to about 12%, and
    Tungsten from about 0.001% to about 15%.

11. The base metal alloy composition of claim 10, further comprising, by weight:
    At least one element selected from the group consisting of:
    Titanium from about 0.001% to about 6%;
    Hafnium from about 0.001% to about 6%;
    Iron from about 0.001% to about 3%;
    Manganese from about 0.001% to about 1%; and
    Zirconium from about 0.001% to about 2%.

12. The base metal alloy composition of claim 11, further comprising, by weight:
    Carbon from about 0.001% to about 2%.

13. The cobalt-base braze alloy composition of claim 9, wherein said composition consists essentially of, by weight:
    Nickel from about 9.5% to about 11.5%;
    Chromium from about 22% to about 24%;
    Aluminum from about 1.5% to about 2.5%;
    Titanium from about 0.75% to about 2.75%;
    Tungsten from about 2% to about 4%;

Platinum from 0% to about 40%;
Palladium from 0% to about 40%;
Rhenium from about 0.001% to about 2%;
Tantalum from about 5% to about 6%;
Carbon from about 0.05% to about 1.05%;
Boron from about 0.5% to about 2.5%;
Silicon from about 4% to about 6%; and
Cobalt balance.

14. The cobalt-base braze alloy composition of claim 9, wherein said composition consists essentially of, by weight:
Nickel from about 9% to about 11%;
Chromium from about 21.5% to about 23.5%;
Tungsten from about 6% to about 8%;
Rhenium from about 0.001% to about 15%;
Tantalum from about 2.5% to about 4.5%;
Platinum from 0% to about 40%;
Palladium from 0% to about 40%;
Carbon from about 0.1% to about 1.1%;
Boron from about 0.5% to about 2.5%;
Silicon from about 4% to about 6%
Zirconium from about 0.001% to about 1.5% and
Cobalt balance.

15. The cobalt-base braze alloy composition according to claim 9, wherein said composition consists essentially of, by weight:
Nickel from about 9.5% to about 11.5%;
Chromium from about 19.5% to about 21.5%;
Aluminum from about 1.25% to about 3.25%;
Tungsten from about 0.25% to about 2.25%;
Rhenium from about 0.001% to about 2%;
Platinum from 0% to about 40%;
Palladium from 0% to about 40%;
Hafnium from about 0.001% to about 0.1%;
Tantalum from about 6.75% to about 8.75%;
Carbon from about 0.001% to about 0.78%;
Boron from about 2% to about 4%; and
Cobalt balance.

16. The cobalt-base braze alloy composition of claim 9, wherein said composition consists essentially of, by weight:
Nickel from about 9.5% to about 11.5%;
Chromium from about 22% to about 24%;
Aluminum from about 0.75% to about 2.75%;
Tungsten from about 0.25% to about 2.25%;
Rhenium from about 0.001% to about 2%;
Hafnium from about 0.001% to about 1%;
Platinum from 0% to about 40%;
Palladium from 0% to about 40%;
Tantalum from about 5.5% to about 7.5%;
Carbon from about 0.05% to about 1.05%;
Boron from about 1.15% to about 3.15%;
Silicon from about 2.25% to about 4.25%; and
Cobalt balance.

17. The cobalt-base braze alloy composition of claim 9, wherein said composition consists essentially of, by weight:
Nickel from about 29% to about 31%;
Chromium from about 13.75% to about 15.75%;
Aluminum from about 2.3% to about 4.4%;
Tungsten from about 0.3% to about 2.4%;
Rhenium from about 0.001% to about 1.5%;
Tantalum from about 7.8% to about 9.8%;
Hafnium from about 0.001% to about 1.5%;
Platinum from 0% to about 40%;
Palladium from about 2% to about 4%;
Carbon from about 0.001% to about 0.8%;
Boron from about 1.3% to about 3.4%;
Silicon from about 2.3% to about 4.4%; and
Cobalt balance.

18. The cobalt-base, base metal alloy composition according to claim 12, wherein said composition consists essentially of, by weight:
Nickel from about 9.0% to about 11.0%;
Chromium from about 21.5% to about 23.5%;
Aluminum from about 1.0% to about 3.0%;
Tungsten from about 4.0% to about 6.0%;
Rhenium from about 0.001% to about 1.5%;
Tantalum from about 5.0% to about 7.0%;
Boron from about 1.15% to about 3.15%;
Platinum from about 16% to about 40%;
Palladium from about 16% to about 40%;
Carbon from about 0.05% to about 1.05%;
Zirconium from about 0.001% to about 1.5%; and
Cobalt balance.

19. The cobalt-base, base metal alloy composition of claim 12, wherein said composition consists essentially of, by weight:
Nickel from about 9.5% to about 11.5%;
Chromium from about 21% to about 23%;
Aluminum from about 0.75% to about 2.75%;
Tungsten from about 3.0% to about 5.0%;
Tantalum from about 5.5% to about 7.5%;
Rhenium from about 0.001% to about 15%;
Platinum from about 16% to about 40%;
Palladium from about 16% to about 40%;
Carbon from about 0.05% to about 1.05%; and
Cobalt balance.

20. The cobalt-base braze alloy composition of claim 8, wherein said composition consists essentially of, by weight:
Nickel from about 9.5% to about 11.5%;
Chromium from about 22% to about 24%;
Aluminum from about 1.5% to about 2.5%;
Titanium from about 0.75% to about 2.75%;
Tungsten from about 2% to about 4%;
Platinum from 0% to about 40%;
Palladium from 0% to about 40%;
Rhenium from about 0.001% to about 2%;
Tantalum from about 5% to about 6%;
Boron from about 0.5% to about 2.5%;
Silicon from about 4% to about 6%; and
Cobalt balance.

21. The cobalt-base braze alloy composition of claim 8, wherein said composition consists essentially of, by weight:
Nickel from about 9% to about 11%;
Chromium from about 21.5% to about 23.5%;
Tungsten from about 6% to about 8%;
Rhenium from about 0.001% to about 15%;
Tantalum from about 2.5% to about 4.5%;

Platinum from 0% to about 40%;
Palladium from 0% to about 40%;
Boron from about 0.5% to about 2.5%;
Silicon from about 4% to about 6%;
Zirconium from about 0.001% to about 1.5%; and
Cobalt balance.

22. The cobalt-base braze alloy composition of claim 8, wherein said composition consists essentially of, by weight:
Nickel from about 9.5% to about 11.5%;
Chromium from about 19.5% to about 21.5%;
Aluminum from about 1.25% to about 3.25%;
Tungsten from about 0.25% to about 2.25%;
Rhenium from about 0.001% to about 2%;
Platinum from 0% to about 40%;
Palladium from 0% to about 40%;
Hafnium from about 0.001% to about 0.1%;
Tantalum from about 6.75% to about 8.75%;
Boron from about 2% to about 4%; and
Cobalt balance.

23. The cobalt-base braze alloy composition of claim 8, wherein said composition consists essentially of, by weight:
Nickel from about 9.5% to about 11.5%;
Chromium from about 22% to about 24%;
Aluminum from about 0.75% to about 2.75%;
Tungsten from about 0.25% to about 2.25%;
Rhenium from about 0.001% to about 2%;
Hafnium from about 0.001% to about 1%;
Platinum from 0% to about 40%;
Palladium from 0% to about 40%;
Tantalum from about 5.5% to about 7.5%;
Boron from about 1.15% to about 3.15%;
Silicon from about 2.25% to about 4.25%; and
Cobalt balance.

24. The cobalt-base braze alloy composition of claim 8, wherein said composition consists essentially of, by weight:
Nickel from about 29% to about 31%;
Chromium from about 13.75% to about 15.75%;
Aluminum from about 2.3% to about 4.4%;
Tungsten from about 0.3% to about 2.4%;
Rhenium from about 0.001% to about 1.5%;
Tantalum from about 7.8% to about 9.8%;
Hafnium from about 0.001% to about 1.5%;
Platinum from 0% to about 40%;
Palladium from about 2% to about 4%;
Boron from about 1.3% to about 3.4%;
Silicon from about 2.3% to about 4.4%; and
Cobalt balance.

25. The cobalt-base, base metal alloy composition according to claim 11, wherein said composition consists essentially of, by weight:
Nickel from about 9.0% to about 11.0%;
Chromium from about 21.5% to about 23.5%;
Aluminum from about 1.0% to about 3.0%;
Tungsten from about 4.0% to about 6.0%;
Rhenium from about 0.001% to about 1.5%;
Tantalum from about 5.0% to about 7.0%;
Platinum from about 16% to about 40%;
Palladium from about 16% to about 40%;
Zirconium from about 0.001% to about 1.5%; and
Cobalt balance.

26. The cobalt-base, base metal alloy composition of claim 11, wherein said composition consists essentially of, by weight:
Nickel from about 9.5% to about 11.5%;
Chromium from about 21% to about 23%;
Aluminum from about 0.75% to about 2.75%;
Tungsten from about 3.0% to about 5.0%;
Tantalum from about 5.5% to about 7.5%;
Rhenium from about 0.001% to about 15%;
Platinum from about 16% to about 40%;
Palladium from about 16% to about 40%; and
Cobalt balance.

27. A cobalt-base environmental coating composition, consisting essentially of, by weight:
Nickel from about 0.001% to <the weight percent of cobalt;
At least one element selected from the group consisting of:
Rhenium from about 0.001% to about 15%;
Palladium from about 0.001% to about 40%;
Platinum from about 0.001% to about 40%;
At least one element selected from the group consisting of:
Boron from about 0.001% to about 6%;
Silicon from about 0.001% to about 10%; and
Cobalt balance.

28. A cobalt-base environmental coating composition, consisting essentially of, by weight:
Nickel from about 0.001% to <the weight percent of cobalt;
One element selected from the group consisting of:
Rhenium from about 0.001% to about 15%;
Palladium from about 0.001% to about 40%;
Platinum from about 0.001% to about 40%; and
Cobalt balance; wherein
said coating composition is a eutectic alloy.

29. The coating composition of claim 28, further comprising, by weight:
Aluminum from about 0.001% to about 12%.

30. The coating composition of claim 27, further comprising, by weight:
At least one element selected from the group consisting of:
Chromium from about 0.001% to about 30%;
Tantalum from about 0.001% to about 15%;
Molybdenum from about 0.001% to about 15%;
Niobium from about 0.001% to about 12%; and
Tungsten from about 0.001% to about 15%.

31. The coating composition of claim 30, further comprising, by weight:
At least one element selected from the group consisting of:
Titanium from about 0.001% to about 6%;
Hafnium from about 0.001% to about 6%;
Iron from about 0.001% to about 3%;
Manganese from about 0.001% to about 1%; and
Zirconium from about 0.001% to about 2%.

32. The coating composition of claim 31, further comprising, by weight:
Carbon from about 0.001% to about 2%.

33. An environmental coating for a superalloy substrate comprising:
at least one layer of a cobalt-base braze alloy composition, consisting essentially of, by weight:
Nickel from about 0.001% to <the weight percent of cobalt;
At least one element selected from the group consisting of:
Rhenium from about 0.001% to about 15%;
Palladium from about 0.001% to about 40%;
Platinum from about 0.001% to about 40%;
At least one element selected from the group consisting of:
Boron from about 0.001% to about 6%;
Silicon from about 0.001% to about 10%; and
Cobalt balance; wherein
said at least one braze alloy layer is positioned over said superalloy substrate; and
at least one layer of a coating material selected from the group consisting of: metal, ceramic; wherein
said at least one coating material layer is positioned over said at least one braze alloy layer.

34. The environmental coating of claim 33, wherein said metal is selected from the group consisting of simple aluminides, platinum aluminides, MCrAl(X)-type compounds, and diffusion braze alloys.

35. An environmental coating for a superalloy substrate comprising:
at least one layer of a coating material selected from the group consisting of: metal, ceramic; wherein
said at least one coating material layer is positioned over said superalloy substrate; and
at least one layer of a cobalt-base braze alloy composition consisting essentially of, by weight:
Nickel from about 0.001% to <the weight percent of cobalt;
At least one element selected from the group consisting of:
Rhenium from about 0.001% to about 15%;
Palladium from about 0.001% to about 40%;
Platinum from about 0.001% to about 40%;
At least one element selected from the group consisting of:
Boron from about 0.001% to about 6%;
Silicon from about 0.001% to about 10%; and
Cobalt balance; wherein
said at least one braze alloy layer is positioned over said at least one coating material layer.

36. The environmental coating of claim 35, further comprising at least one additional coating material layer positioned over said at least one braze alloy layer; wherein
said at least one additional coating material layer comprises a coating material selected from the group consisting of: metal, ceramic.

37. The environmental coating of claim 35, wherein said metal is selected from the group consisting of simple aluminides, platinum aluminides, MCrAl(X)-type compounds, and diffusion braze alloys.

* * * * *